No. 784,551. PATENTED MAR. 14, 1905.
C. E. CURTISS.
CLUTCH SHIFTING DEVICE.
APPLICATION FILED JULY 29, 1904.
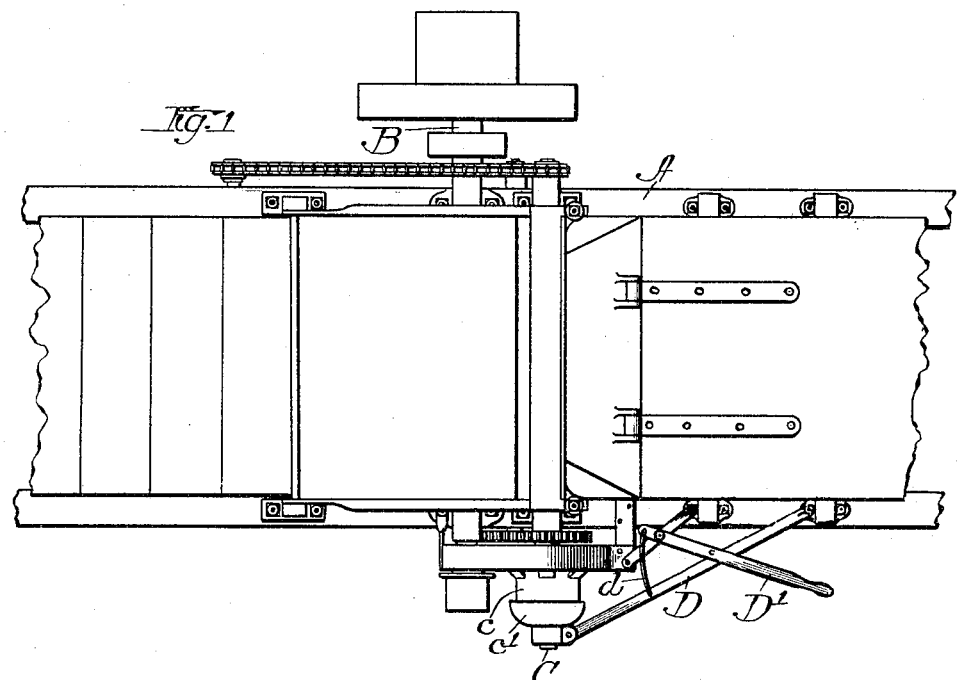
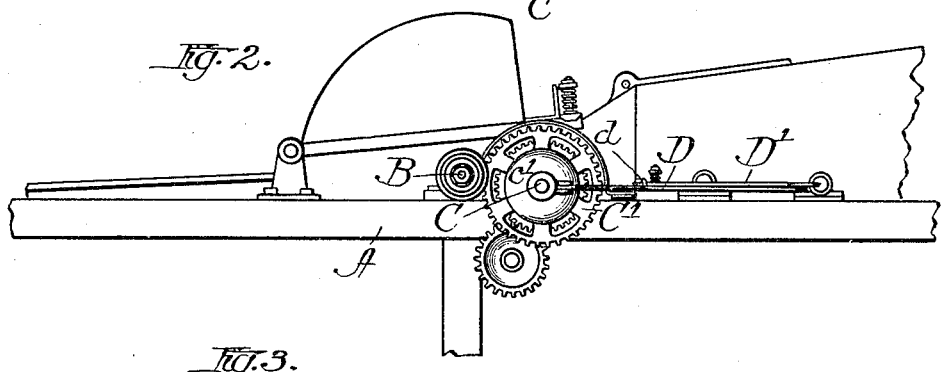
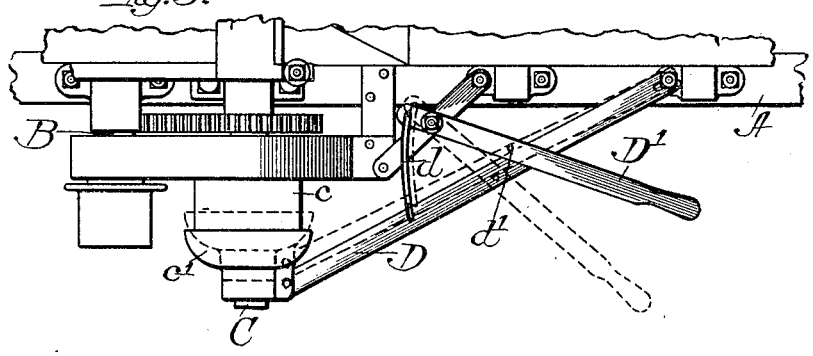
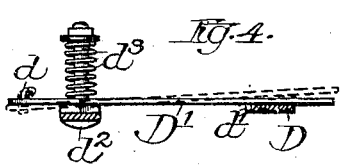
Witnesses:
Inventor
Charles E. Curtiss.
Attorney.

No. 784,551.

Patented March 14, 1905.

UNITED STATES PATENT OFFICE.

CHARLES E. CURTISS, OF CHICAGO, ILLINOIS, ASSIGNOR TO INTERNATIONAL HARVESTER COMPANY, OF CHICAGO, ILLINOIS, A CORPORATION OF NEW JERSEY.

CLUTCH-SHIFTING DEVICE.

SPECIFICATION forming part of Letters Patent No. 784,551, dated March 14, 1905.

Application filed July 29, 1904. Serial No. 218,657.

*To all whom it may concern:*

Be it known that I, CHARLES E. CURTISS, a citizen of the United States, and a resident of Chicago, in the county of Cook and State of Illinois, have invented certain new and useful Improvements in Clutch-Shifting Devices, of which the following is a specification sufficiently clear and exact to enable those skilled in the art to which it appertains to make and use the same.

The invention relates to clutches, and more especially to the means for throwing them into and out of operation.

It has for its object to provide a shifting device comprising levers so connected together that they engage when the clutch is thrown either into or out of operation, thereby forming a self-locking device which is cheap and at the same time effective.

In the accompanying drawings an embodiment of the invention is shown as applied to the clutch of a husker and shredder of a well-known type.

In the drawings, in which like characters of reference designate like parts, Figure 1 is a fragmentary plan view of a husker and shredder, showing the application of the invention. Fig. 2 is a side elevation of the parts shown in Fig. 1. Fig. 3 is an enlarged plan view of a portion of the parts shown in Fig. 1, showing by dotted lines the operation of the invention. Fig. 4 is a side elevation of a portion of the operating-lever, showing the operation of the spring for retaining it in its locked position.

Referring to the drawings, A designates the main frame of the shredder, upon which the driving-shaft B, carrying the shredder-head, is mounted. Journaled upon the shaft C of the lower snapping-roll is the gear $C'$, which meshes with a corresponding gear secured to the driving-shaft. Between the shaft C and the gear $C'$ is located a clutch of the form shown in Figs. 14 and 15 of my Patent No. 745,483, dated December 1, 1903. It will be seen, then, that the shaft C carries a spring-pressed pawl which is adapted to engage with ratchets on the inner side of the hub $c$ of the gear $C'$, whereby the shaft is turned with the gear. Slidably mounted upon the end of the shaft C is the clutch-shifter $c'$, which is adapted to engage the pawls and to throw them out of engagement with the ratchets. The present invention, however, involves the means for moving the clutch-shifter to throw the clutch into or out of operation and for locking the same in either position. A shifting lever D is provided, one end of which is pivotally connected with the clutch-shifter $c'$ and the other end with the main frame by means of a pivotal sliding connection. Mounted upon the main frame is an operating-lever $D'$, one end of which is connected to the shifting lever by means of a link $d$, whereby when the operating-lever is moved the shifting lever, and consequently the clutch-shifter, is moved correspondingly. This operating-lever crosses the shifting lever and is provided with a detent $d'$, which is adapted to engage one side of the shifting lever when the clutch is disconnected and the other side when it is thrown into operation. Mounted upon the pivot-pin $d^2$ of the operating-lever and adapted to react between retaining means at the end of the pin and the lever is the spring $d^3$, which permits the lever to be deflected laterally relative to the shifting lever sufficiently to disengage the detent therefrom. By these means a simple and efficient clutch-shifting device is provided which is self-locking, the operation of which will be readily understood from the above description of the several parts without further comment. It will be seen, however, that the invention is not only applicable to a clutch of the type herein shown, but is readily applied to clutches of any desired form. It can also be used as effectively in shifting belts from one pulley to another, since it is only necessary to replace the clutch-engaging means with means for engaging the belt. Many other modifications of the invention also will suggest themselves. Hence it is not the desire to limit this application to the present embodiment, but to have it interpreted as broadly as is commensurate with the invention.

Having thus described my invention, what I claim as new, and desire to secure by Letters Patent, is—

1. In a clutch-shifting device, the combination with the means for engaging the clutch, of a shifting-bar connected therewith, an operating-lever connected with said bar and means for engaging said lever with said bar to lock the clutch in the operative or inoperative position.

2. In a clutch-shifting device, the combination with the means for engaging the clutch, of a shifting bar connected therewith, an operating-lever, a connection between said bar and lever and a detent for said lever adapted to engage said bar to lock it in the shifted position.

3. In a clutch-shifting device, the combination of a clutch-shifter, a shifting lever pivoted thereto, an operating-lever connected with said lever, a detent for locking said levers in the shifted position and means for holding said detent in operation.

4. In a clutch-shifting device, the combination of a clutch-shifter, a shifting lever pivoted thereto, an operating-lever, a link connecting said levers, a detent for locking said levers together in the shifted position and a spring for holding said detent in operation.

5. In a clutch-shifting device, the combination of a clutch-shifter, a shifting lever pivoted thereto, an operating-lever, a link connecting said levers, a detent for said operating-lever adapted to engage said shifting lever, a pivot-pin for said operating-lever, and a spring mounted on said pin and adapted to hold said detent in engagement with said shifting lever.

In testimony whereof I have signed my name to this specification in the presence of two subscribing witnesses.

CHARLES E. CURTISS.

Witnesses:
M. LOIS CATLIN,
E. W. BURGESS.